United States Patent [19]

Varnum

[11] Patent Number: 5,744,721
[45] Date of Patent: Apr. 28, 1998

[54] ELECTRONIC CONTROL SYSTEM FOR AN OPTICAL ASSEMBLY

[75] Inventor: Steven Scott Varnum, Tigard, Oreg.

[73] Assignee: Hinds Instruments, Inc., Hillsboro, Oreg.

[21] Appl. No.: 548,502

[22] Filed: Oct. 25, 1995

[51] Int. Cl.[6] .................... H04B 10/04; G02F 1/33; G02F 1/11
[52] U.S. Cl. .................... 73/579; 73/662; 359/180; 356/349; 356/351
[58] Field of Search .................... 331/1 R, 65, 158; 310/316; 359/180, 187; 356/345, 349, 351, 368; 73/579, 662

[56] References Cited

U.S. PATENT DOCUMENTS

| | | | |
|---|---|---|---|
| 3,867,014 | 2/1975 | Kemp | 359/286 |
| 4,460,249 | 7/1984 | Vincent | 350/356 |
| 4,654,586 | 3/1987 | Evans, Jr. et al. | 324/83 |
| 4,783,852 | 11/1988 | Auracher | 455/619 |
| 4,865,450 | 9/1989 | Munechika et al. | 356/349 |
| 5,092,677 | 3/1992 | Curtis | 356/414 |
| 5,170,274 | 12/1992 | Kuwata et al. | 359/182 |

FOREIGN PATENT DOCUMENTS

WO86/06505  11/1986  WIPO.

OTHER PUBLICATIONS

International Search Report for PCT/US96/17171 dated Mar. 12, 1997, 7 pages.

Hayashi, "A Versatile Photoelastic-Modulator Driver/Controller," *Japanese Journal of Applied Physics*, vol. 28, No. 4, Apr., 1989, pp. 720–722.

Stenflo, "Demodulation of all Four Stokes Paramaters With a Single CCD Zimpol II —Conceptual Design," *LEST Foundation*, Technical Report No. 54, 1992, pp. 1–13.

Analog Devices, "Ultrahigh Speed Phase/Frequency Discriminator," Design-in Reference Manual 3 pages (circa Jan. 1994).

PEM-80 Photoelastic Modulator Operation and Service Manual, Hinds International, Inc., 77 pages (circa Jan. 1982.

PEM-90™ Photoelastic Modulators brochure, 11 pages (circa Jan. 1991).

*Primary Examiner*—Hezron E. Williams
*Assistant Examiner*—Rose M. Miller
*Attorney, Agent, or Firm*—Klarquist Sparkman Campbell Leigh & Whinston, LLP

[57] ABSTRACT

An electronic control system that accurately maintains oscillation of an optical assembly at resonance. In the preferred embodiment, a signal control circuit delivers an input signal to an optical assembly. A resonance detector detects the difference in phase between the input signal and a feedback signal from the optical assembly. The phase difference is used to determine whether the optical assembly is at resonance. The signal control circuit is responsive to the resonance detector and modifies the frequency of the input signal to oscillate the optical assembly at its resonant frequency. The electronic control system can also maintain multiple optical assemblies at resonance.

3 Claims, 3 Drawing Sheets

ELECTRONIC CONTROL SYSTEM FOR AN OPTICAL ASSEMBLY

FIELD OF THE INVENTION

This invention relates generally to electronic control systems and, more particularly, to a controller for maintaining the oscillation of an optical assembly, which includes a transducer bonded to an optical element, at resonance.

BACKGROUND OF THE INVENTION

Some optical applications require an optical assembly to be vibrated at a desired frequency. This proves particularly useful in applications in which an optical element that is mechanically stressed by the vibration exhibits birefringence proportional to the resulting strain.

An example of such an application is a photoelastic modulator. Photoelastic modulators are used to vary the polarization of a beam of light. This type of modulator can be used to measure circular and linear dichroism, birefringence, and optical rotation. The modulator may also be used for ellipsometry, polarimetry, reflection difference spectroscopy and the like.

When operating a photoelastic modulator, an electrical signal is applied to the transducer causing the optical assembly to oscillate (vibrate). Optimally, the optical assembly will oscillate at its resonant frequency. Accurate control of the optical assembly's vibration, however, has been problematic. Thermal effects, noise and other phenomena can alter the resonant frequency of the optical assembly, thus, making it difficult to maintain its resonant vibration.

Prior control circuits implement feedback loops to more accurately maintain the optical assembly oscillating at its resonant frequency. The optical assembly acts in a manner similar to a quartz crystal in a crystal controlled oscillator, in that voltage applied to the transducer causes oscillation in the optical assembly. The amplitude of the voltage applied to the optical assembly is based on the amplitude of a feedback signal from the optical assembly. These circuits include an inductor and capacitor tank circuit tuned to the resonant frequency of the optical assembly. The tank circuit also provides for impedance matching of the optical assembly.

These prior circuits, however, must be tuned and calibrated individually—a process which can become time consuming when calibrating production quantities. They also have instability in the amplitude of the input signal to the optical assembly, which is caused primarily by thermal effects that occur when operating the inductor at high voltage levels. The instability is further caused by the slow response and overshoot of the control circuit. Consequently, the prior circuits are not capable of compensating for sudden changes in the feedback signal amplitude before these changes cause overall amplitude instability.

A further problem with the prior circuits is that they can not easily facilitate control of more than one optical assembly. It is often desirable to have two or more optical assemblies synchronized. Two synchronized optical assemblies can, for example, allow all four Stokes parameters (which are used to characterize the polarization of light) to be obtained in a single measurement. The prior circuits coupled to the low or output end of the transducer for a synchronizing signal to a second optical assembly. Synchronization and amplitude control is difficult, however, due to noise and loading problems.

An object of the invention is to provide a control circuit that maintains the vibration of an optical assembly at its resonant frequency.

Another object of the invention is to provide a control circuit capable of synchronizing multiple optical assemblies with precisely defined amplitude and phase relationships.

A further object of the invention is to provide a control circuit that accurately controls the amplitude of the input signal to the optical assembly, thereby controlling the amplitude of the optical assembly's mechanical vibration.

SUMMARY OF THE INVENTION

The present invention provides an electronic control system that accurately maintains the oscillation of an optical assembly at resonance. The electronic control system may also provide a signal to which parallel optical assemblies can be connected and synchronized.

In the preferred embodiment, a signal control circuit delivers an input signal to an optical assembly. A resonance detector detects the difference in phase between the input signal and a feedback signal from the optical assembly. The phase difference is used to determine whether the optical assembly is at resonance. The signal control circuit is responsive to the resonance detector and modifies the frequency of the input signal to maintain the oscillation of the optical assembly at its resonant frequency.

The electronic control system may contain other features if desired. For example, synchronizing logic may be added so that multiple optical assemblies are synchronized together at the resonant frequency.

The above described features of the present invention will be more readily apparent from the following detailed description of preferred embodiments with reference to the accompanying drawings.

DETAILED DESCRIPTION OF THE PREFERRED EMBODIMENTS

Figure 1:
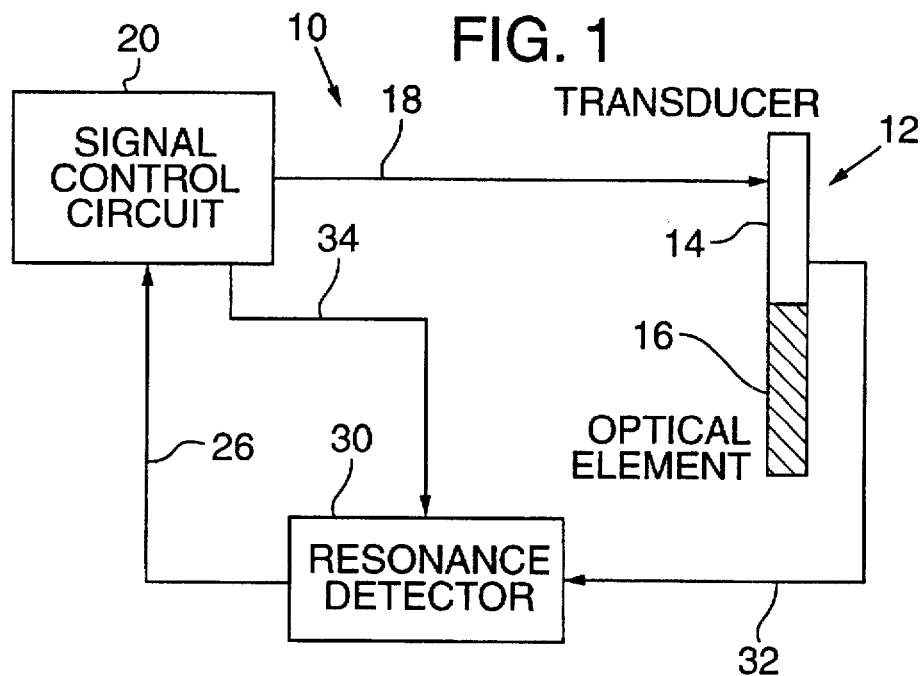
FIG. 1 is a block diagram of an electronic control system according to the invention for maintaining an optical assembly at resonance.

Referring to FIG. 1, an electronic control system 10 is shown that maintains the oscillation of an optical assembly 12 at its resonant frequency. The optical assembly 12 includes a transducer 14 bonded to an optical element 16, such as fused silica. When an electrical signal is applied to the transducer, the transducer vibrates the optical element along the optical element's long dimension.

A signal control circuit 20 is coupled to the transducer 14 by signal path 18. The signal control circuit provides an alternating signal to the transducer that has a frequency based on the voltage level on a signal path 26. The electronic control system 10 will adjust the voltage level on signal path 26 so that the signal control circuit will oscillate the optical assembly at substantially its resonant frequency as will be further described.

A resonance detector 30, which is a component of the electronic control system 10, receives a feedback signal from the optical assembly 12 on a signal path 32. The resonance detector 30 also receives a signal from the signal control circuit 20 on a signal path 34 that is substantially similar to the signal provided to the transducer 14. The resonance detector, thus, receives substantially the input and feedback signals from the optical assembly 12. The resonant detector compares the phase between the signals and provides a signal on signal path 26 based on the phase difference. Ideally, when the optical assembly is oscillating at its resonant frequency, the impedance of the transducer will be purely resistive. Consequently, the phase between the input and feedback signals of the optical assembly will be matched so that the output from the resonance detector is unchanged.

The signal control circuit 20 is responsive to changes in the signal on the signal path 26 to modify the frequency of the signal provided to the optical assembly 12 until it oscillates the optical assembly 12 at substantially its resonant frequency.

Figure 2:
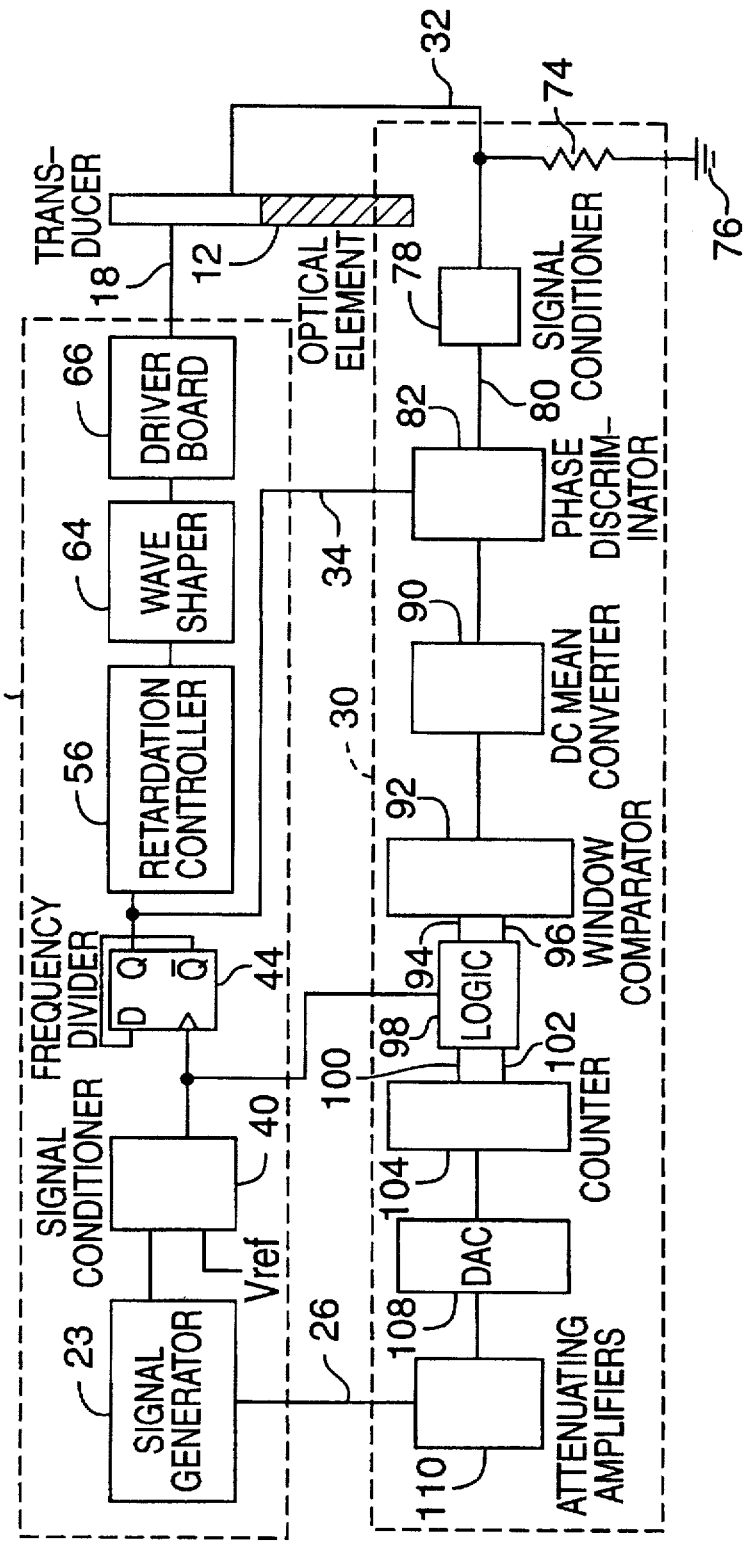
FIG. 2 is a circuit diagram of the electronic control system of FIG. 1.

FIG. 2 shows the electronic control system 10 in more detail. The signal control circuit 20 includes a signal generator 23 that provides an output sine wave; A signal conditioner 40 that converts the sine wave to a square wave; A frequency divider 44 that divides the square wave from the conditioner in half; A retardation controller 56 that modifies the amplitude of the signal provided by the frequency divider 44; A wave shaper 64 that converts the signal provided by the retardation controller into a sine wave; and a driver board 66 that amplifies the sine wave from the wave shaper for delivery to the optical assembly 12. Each of these components will be discussed in turn more thoroughly below.

The signal generator 23 is preferably a Maxim 038 waveform generator. The generator includes a voltage controlled oscillator (not shown) that modifies the frequency of an output based on the voltage the generator receives on signal path 26. The generator provides a signal that is twice the frequency "2F" that is finally delivered to the optical assembly 12. This 2F signal is used, in part, for synchronization purposes as is later described.

The signal from the generator 23 is converted to a TTL signal level by the signal conditioner 40, which is preferably a LM339 comparator. The signal conditioner has two inputs, one of which is coupled to the generator 23 and the other of which is coupled to a reference voltage Vref. The signal conditioner also converts the signal from a sine wave to a square wave. The reference voltage can be used to modify the duty cycle of the square wave.

The frequency divider 44 is preferably a D flip-flop. The D flip-flop is coupled to the signal conditioner and is configured to divide the frequency of the signal from the signal conditioner in half. Specifically, the comparator 40 output is coupled to a clock input of the D flip-flop. A $\overline{Q}$ output of the D flip-flop is coupled to a D input. A Q output provides a signal oscillating at frequency F. Although the frequency divider 44 is shown as a D flip-flop, other types of frequency dividers are well known and may be used in place of the D flip-flop.

The retardation controller 56 is used for retardation amplitude control. Retardation is a term used in conjunction with photoelastic modulators. When light is directed through an optical element that is either compressed or stretched along an axis perpendicular to the light path, a horizontal polarization component of the light may lead or lag a vertical polarization component. The phase difference between the horizontal and vertical components is the retardation, and the peak retardation is the amplitude of the sinusoidal retardation as a function of time.

The retardation controller is preferably an AD 534 analog multiplier (not shown) coupled to the Q output of the D flip-flop. The analog multiplier is also coupled to a 0–5 VDC adjustable control voltage (not shown). The amplitude of the retardation can be varied through the control voltage. Changing the retardation amplitude and, consequently, the amplitude of the signal reaching the optical assembly 12, allows the optical assembly to be used for quarter-wave or half-wave retardation. Quarter-wave retardation occurs when the peak retardation reaches one-fourth of the wavelength of light. When this happens, the modulated optical element rotates the plane of polarization by forty-five degrees. Half-wave retardation has a peak retardation of one-half the wavelength of light, so that the plane of polarization is rotated ninety degrees.

The retardation controller 56 outputs a square wave signal that is reshaped into a sine wave by the wave shaper 64, which is preferably a low pass RC filter network.

The driver board 66 takes the low level voltage waveform from the wave shaper 64 and amplifies it to the voltage levels necessary for driving the transducer of optical assembly 12. Preferably, the driver board is an APEX PA42 hybrid high power monolithic amplifier powered by two 175 volt power supplies so that the waveform to the transducer can reach 350 volts peak-to-peak.

The driver board 66 is coupled to the transducer of the optical assembly 12 by the signal path 18, which is preferably a coaxial cable. The transducer is preferably a quartz piezoelectric transducer.

The resonance detector 30 includes a resistor 74, a signal conditioner 78, a phase discriminator 82, a DC mean converter 90, a window comparator 92, logic gates 98, a counter 104, a digital-to-analog converter 108, and attenuating amplifiers 110, each of which is further discussed below.

The optical assembly 12 is connected by the signal path 32, which is preferably coaxial cable, to the resistor 74. The resistor has its low side connected to a ground 76. The resistor is coupled to the signal conditioner 78, which is preferably a comparator having a high input impedance. A low level current signal entering the signal conditioner reflects the voltage drop across resistor 74. The signal conditioner is preferably a LM 339 and converts the low level current signal to a TTL square wave.

The signal conditioner 78 is coupled to the phase discriminator 82 by signal path 80. The phase discriminator is similar to the AD9901 manufactured by Analog Devices. The phase discriminator includes two D flip-flops and an Exclusive-OR gate (not shown) configured to generate a signal with a duty cycle that corresponds to the phase relation of two input signals to the phase discriminator. In this case, the two input signals are supplied on signal path 80 from the signal conditioner 78 and signal path 34, which is the Q output signal from the frequency divider 44.

The phase relation between these signals is important because when the optical assembly oscillates at resonance, the transducer impedance is purely resistive and the signals received by the phase discriminator will be in phase. Conversely, when the optical assembly's oscillation is other than resonant frequency, the transducer will contain inductive or capacitive components, and the phase of the feedback signal from the transducer will lag or lead the phase of the input signal to the transducer. The input signals provided to the phase discriminator 82 will be substantially similar to the signal delivered on coaxial cable 18 to the optical assembly 12 and the feedback signal provided on cable 32 from the optical assembly 12. Consequently, the phase discriminator 82 generates a signal that corresponds to the phase relation of the input signal to and the feedback signal from the optical assembly 12.

The phase discriminator 82 is coupled to the DC mean converter 90 which is preferably a low pass filter to extract the DC mean value of an output signal from the phase discriminator. The DC mean value is proportional to a difference in phase between the input signals to the phase discriminator.

The window comparator 92 is coupled to the output of the DC mean converter and includes two output signals provided on signal paths 94, 96. One output 94 is active when the DC mean value rises above a first predetermined voltage level (not shown). The other output 96 is active when the DC mean value falls below a second predetermined voltage (not shown). If the DC mean is between the first and second predetermined voltage, the input signals 34, 80 to the phase discriminator 82 are substantially phase matched and electronic control system 10 is considered in lock (i.e., the optical assembly is oscillating at substantially its resonant frequency). The size of the window in which lock will occur can be adjusted (using the first and second predetermined voltages) based on how closely a user wants the input signals to the phase discriminator 82 to be in phase. The signal paths 94, 96 from the window comparator are coupled to an Exclusive-OR gate (not shown) whose output is tied to the low end of an LED (not shown). Consequently, when the electronic control system is in lock the LED will illuminate. Other alternatives for indicating that the system is in lock can be used. For example, the output of the Exclusive-OR gate can be provided to an external device, such as a personal computer, which can display that the system is in lock or use the lock indication to trigger a process.

The logic gates 98 are coupled to the signal paths 94, 96 from the window comparator 92. The logic gates provide a countup signal on signal path 100 and a countdown signal on signal path 102. The logic gates include an AND gate (not shown) coupled to the output of the signal conditioner 40. The AND gate thus receives the 2F signal to synchronize and convert the countup and countdown signals to a pulse train.

The countup and countdown signal paths 100, 102 are coupled to the up/down counter 104. The up/down counter is preferably 16 bits wide and includes four 4-bit counters. The counter increments when the countup signal is active and decrements when the countdown signal is active. The counter will not count if the outputs of the window comparator 92 are inactive, which occurs when the electronic control system is in lock.

The counter 104 has its 16-bit output connected to the digital-to-analog converter 108. The digital-to-analog converter converts the counter output to an analog signal necessary for input to the signal generator 23. The attenuating amplifiers 110 adjust the analog voltage level from the digital-to-analog converter 108 to acceptable voltage levels for the signal generator 23. Preferably, the incremented changes in voltage levels provided to the signal generator will be about 68 microvolts.

Figure 3:
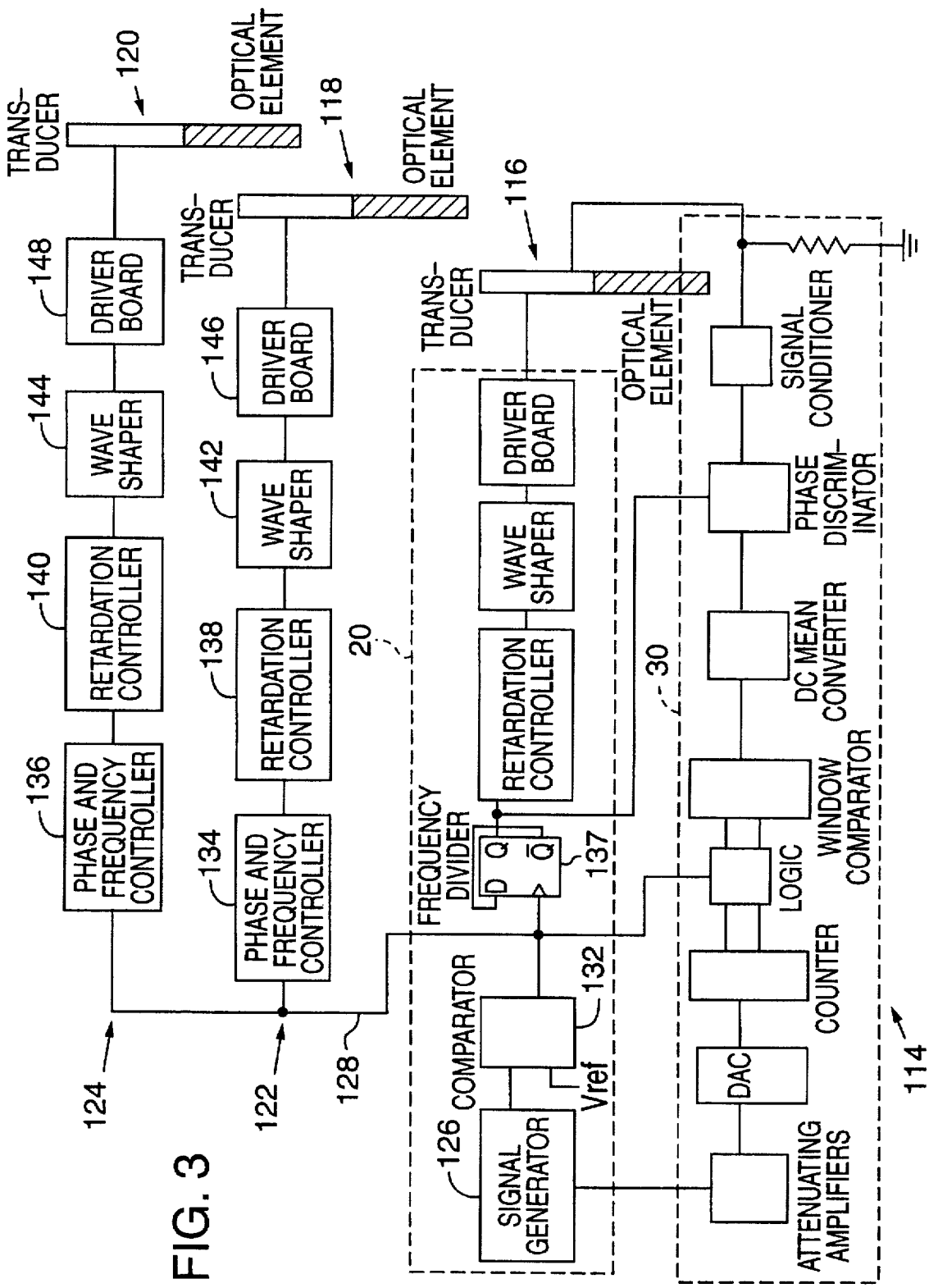
FIG. 3 is a circuit diagram of another embodiment of the present invention with an electronic control system for maintaining multiple optical assemblies at resonance.

FIG. 3 shows another embodiment of the present invention where an electronic control system 114 is used to operate multiple optical assemblies 116, 118 and 120.

Electronic control system 114 is similar to the electronic control system 10 described above. In this embodiment, the electronic control system 114 also acts as a master controller for slave controllers 122, 124, which are electrically combined in parallel to the master controller. The electronic control system 114 is designated the master controller because the resonant frequency of the optical assembly 116 dictates what frequency a signal generator 126 will drive the slave optical assemblies as will be further described. Preferably, the optical assemblies 118, 120 will have a resonant frequency that closely matches the resonant frequency or a sub-harmonic frequency of the optical assembly 116.

The slave controller circuits 122, 124 are coupled to master controller 114 by signal path 128 coupled to the output of a comparator 132 of the master controller. Each slave controller 122, 124 has an input phase and frequency controller 134, 136, respectively. This allows the phase and frequency of the signals delivered to the optical assemblies 118, 120 to be different than that of the signal to the optical assembly 116 of the master controller, while being synchronous. For example, the phase and frequency controllers 134, 136 can include D flip-flops that trigger on an opposite edge than a D flip-flop 137 of the master controller 114. This will result in the "slave" optical assemblies 118, 120 being 90 degrees out of phase with the master optical assembly 116. Similarly, the frequency can easily be controlled by using two or more D flip-flops to divide the frequency. Thus, the parallel optical assemblies can be operated at sub-harmonic frequencies of each other. Other alternatives for modifying phase and frequency will be readily apparent to one skilled in the art.

The slave controllers 122, 124 may also include separate retardation control circuits 138, 140 for controlling the retardation amplitude of the signals provided to the optical assemblies 118, 120 respectively. The controllers 122, 124 also contain wave shapers 142, 144, and driver boards 146, 148 similar to those already described in connection with the embodiment illustrated in FIG. 2.

The comparator 132 of the master controller 114 may also have an adjustment for changing the phase of signals delivered to the slave controllers 122, 124. Specifically, the comparator 132 has an adjustable reference voltage allowing precise control of the phase relationship between the optical assembly 116 and the slave optical assemblies 118, 120 as the duty cycle is varied on an output from the signal generator 126.

Other features can be incorporated into the electronic control system. For example, impedance controls can be placed in the electronic control system 114 between the signal generator 126 and the optical assembly 116. Slave controllers can have similar impedance controls so that the master and slave controllers can be impedance matched. An example of impedance controls can be a 0–20 pf variable capacitor.

Figure 4:
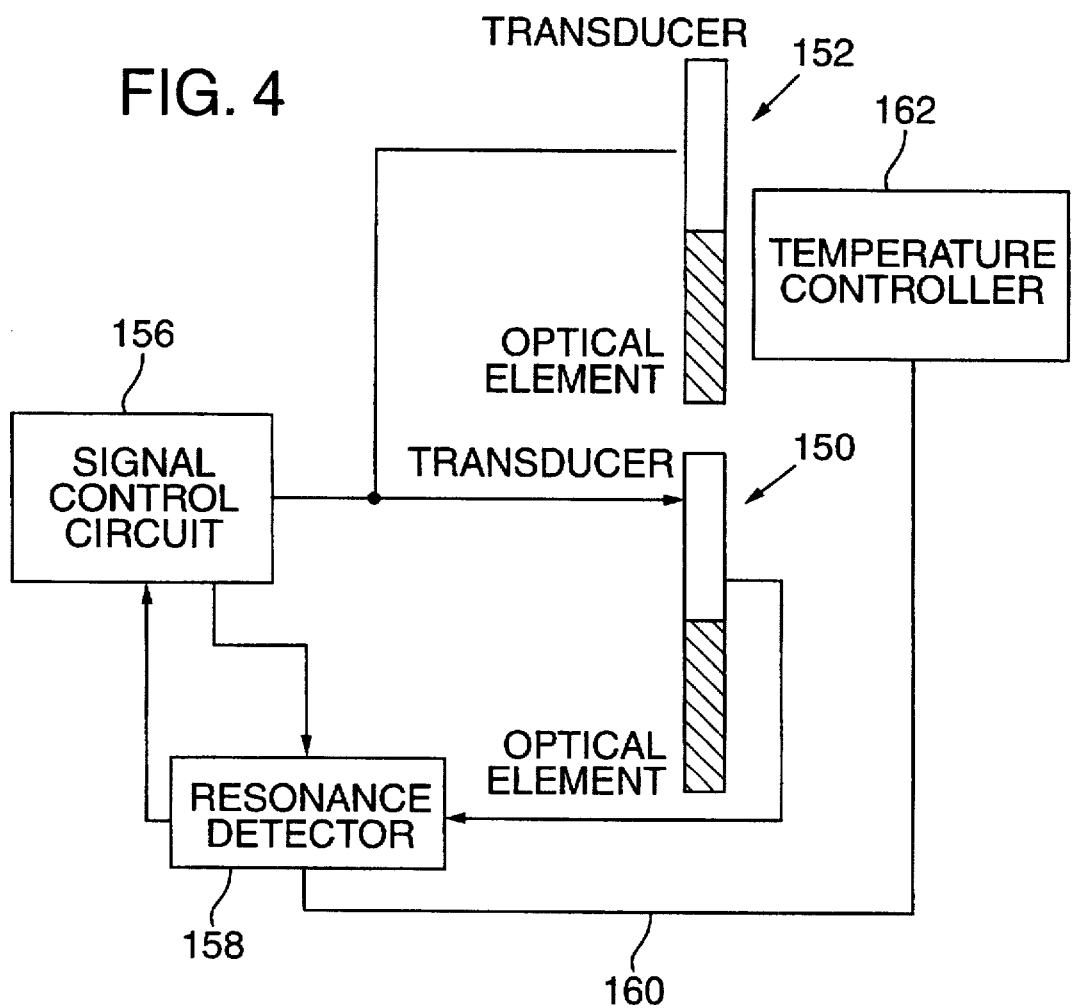
FIG. 4 is a block diagram of another embodiment of the present invention with an electronic control system for independently controlling the temperature of a parallel optical assembly.

FIG. 4 shows another embodiment with multiple optical assemblies 150, 152 in parallel. The circuit shown in FIG. 4 is substantially similar to that shown in FIG. 1. However, an additional optical assembly 152 is coupled to a signal control circuit 156. A resonance detector 158 is coupled by signal path 160 to a temperature controller 162 adjacent the optical assembly 152.

The temperature controller may be used to control and maintain synchronicity of the optical assemblies 150, 152. For example, the temperature controller 162 can be a thermal film heating element or a small convection fan. Preferably, the output of the resonance detector 158 coupled to the temperature controller will be similar to the countup and countdown outputs of FIG. 2. Thus, based on the whether the countup or countdown line is activated, the optical assembly 152 can be heated or cooled. For example, if the countup line is activated the thermal heating element can heat the optical assembly. Conversely, if the countdown is activated the fan can cool the optical assembly. Because the resonant frequency of an optical assembly is related to temperature, this apparatus can be used to shift the resonant frequency of a slave controller head (in this case optical assembly 152) with that of the master controller head (in this case optical assembly 150). The temperature controller can also be synchronized to an external system clock.

Additionally, the temperature of an optical assembly can be derived. This can be accomplished based on known characteristics of the optical assembly and the frequency at which the signal generator is driving the optical assembly. This information could be coupled to a display allowing a user to monitor the optical assembly's temperature.

Further, a front user panel can be added as well as PC interface for remote control. For example, the retardation controller was already described as including a 0–5 VDC adjustable control voltage. With the use of a switch, the 0–5 VDC adjustable control voltage can be switched to a user input. Thus, instead of having the 0–5 VDC control voltage, the user can supply their own voltage level to control the retardation amplitude. Alternatively, the front panel can allow the user to control the amplitude of the control voltage by incrementing or decrementing a digital display which will correspondingly change the control voltage and, consequently, the retardation amplitude.

The optical assemblies in FIG. 3 can be used in a number of different configurations. One configuration can have the optical assemblies aligned in series (i.e., back-to-back) so that a light beam that travels through one optical assembly will travel through an adjacent optical assembly. When the optical assemblies are in series they are preferably as close to identical as possible. This allows calculations to be performed on a narrow span of wavelengths of the light beam. For example, light within the visible wavelength or light within the infrared wavelength can be used, but not both.

A second configuration can have the optical assemblies in parallel (i.e., side-to-side). This allows a light source spanning, for instance, the visible and infrared wavelengths to be split using a beam splitter. The visible light can pass through one optical assembly and the infrared light can pass through the other optical assembly. This allows measurement of a broad spectrum of light including visible, infrared, and ultraviolet wavelengths.

Having described and illustrated the principles of our invention with reference to preferred embodiments thereof, it will be apparent that these embodiments can be modified in arrangement and detail without departing from the principles of the invention.

For example, although retardation controller is shown as using a voltage controller coupled to an analog multiplier, there are other possible retardation controllers. For example, the voltage controller can be replaced by a programmable gain amplifier controlled by either a digital potentiometer or a digital-to-analog converter and a microcontroller.

Additionally, although two slave circuits are shown in FIG. 3 and only one slave in FIG. 4, any desired amount of slave circuits may be connected. Fan-out limitations on comparator 132 can be corrected using additional buffers.

Further, while many circuit components were shown, many of the components can be replaced by a single circuit or processor. Examples include gate arrays, field programmable gate arrays, programmable array logic, and phase-lock loops. The electronic control system can also have parts implemented in software.

It will be recognized that to "couple" or any form thereof, used in the context of this application, is understood by those skilled in the art to mean either directly connected or having components therebetween. For example, a circuit having element A physically connected to B and B physically connected to C, may be described as having A coupled to B or having A coupled to C.

In view of the wide variety of embodiments to which the principles of our invention can be applied, it should be apparent that the detailed embodiments are illustrative only and should not be taken as limiting the scope of my invention. Rather, we claim as our invention all such modifications as may come within the scope of the following claims and equivalence thereto.

The invention claimed is:

1. An electronic control system for maintaining the oscillation of an optical assembly at resonance, the electronic control system comprising:

a signal control circuit for delivering an input signal to the optical assembly;

a resonance detector for detecting a difference in phase between the input signal and a feedback signal from the optical assembly and for providing a control signal based on the phase difference;

the signal control circuit being responsive to the control signal for modifying the frequency of the input signal to oscillate the optical assembly substantially at resonance; and a second optical assembly and a temperature controller responsive to the resonance detector for modifying the temperature of the second optical assembly.

2. An electronic control system for maintaining the oscillation of an optical assembly at resonance, the electronic control system comprising:

a signal control circuit for delivering an input signal to the optical assembly;

a resonance detector for detecting a difference in phase between the input signal and a feedback signal from the optical assembly and for providing a control signal based on the phase difference;

the signal control circuit being responsive to the control signal for modifying the frequency of the input signal to oscillate the optical assembly substantially at resonance;

a retardation controller including an analog multiplier and a variable voltage controller coupled between the optical assembly and the signal generator for controlling the retardation amplitude of the input signal.

3. A method of maintaining the oscillation of an optical assembly at resonance, the method comprising the steps:

generating an input signal having a first phase using a signal generator;

applying the input signal to an input of the optical assembly;

receiving from the optical assembly a feedback signal having a second phase;

comparing the first and second phase and providing a control signal to the signal generator based on the phase difference between the input and feedback signals; and modifying the frequency of the input signal in response to the control signal to oscillate the optical assembly at substantially the resonant frequency of the optical assembly wherein the modifying step includes matching the phase of the input and feedback signals.

* * * * *